W. H. PHILLIPS.
LAWN MOWER.
APPLICATION FILED MAY 6, 1920.

1,370,358.

Patented Mar. 1, 1921.

Inventor—
Wesley H. Phillips,
By Frank P. Shepard.
Attorney

UNITED STATES PATENT OFFICE.

WESLEY H. PHILLIPS, OF OKLAHOMA, OKLAHOMA.

LAWN-MOWER.

1,370,358.  Specification of Letters Patent.  Patented Mar. 1, 1921.

Application filed May 6, 1920. Serial No. 379,209.

*To all whom it may concern:*

Be it known that I, WESLEY H. PHILLIPS, a citizen of the United States, and a resident of Oklahoma city, in the county of Oklahoma, and State of Oklahoma, have invented certain Improvements in Lawn-Mowers, of which the following is a specification, reference being had to the accompanying drawings.

An object of the invention is to provide improved means whereby a lawn mower of the revolving-knife type may be converted into the reciprocating-sickle type.

Other objects and advantages of the invention will be set forth in the ensuing description.

Figure 1:
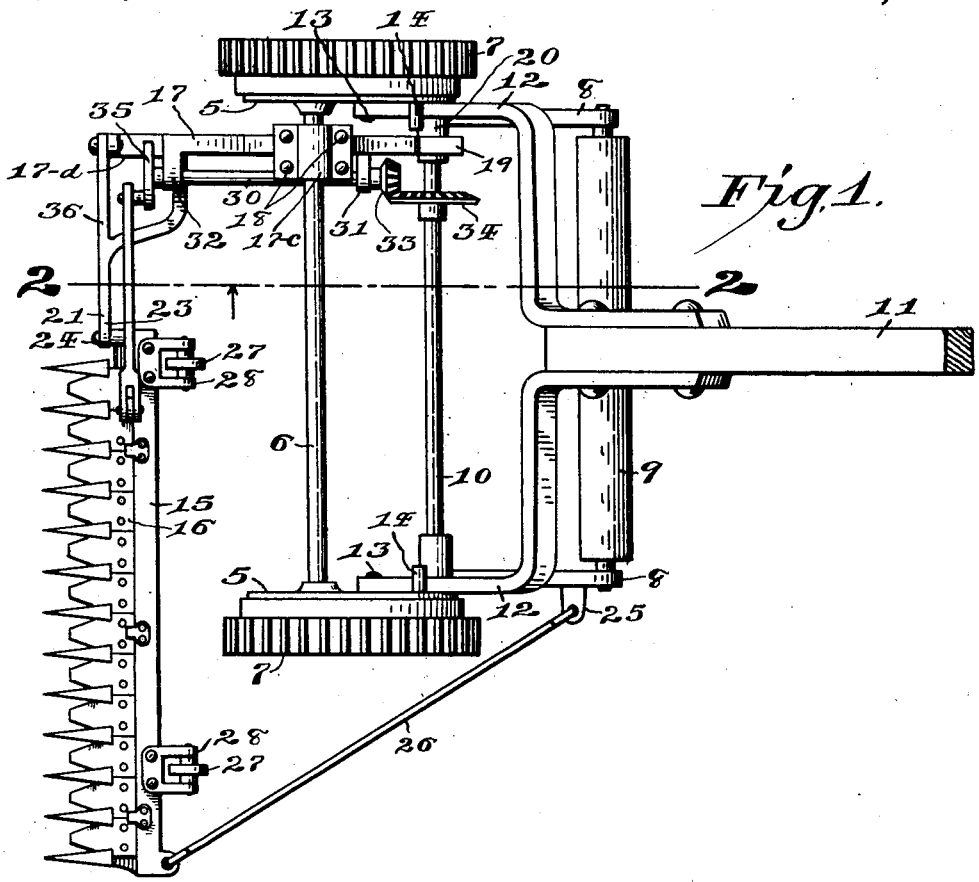

Figure 1 of the drawings is a plan view of a lawn mower which has been changed from the revolving-knife type to the reciprocating-sickle type.

Figure 2:
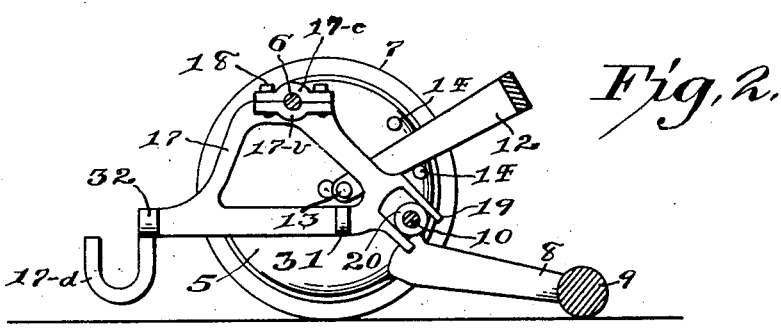

Fig. 2 is a sectional view taken on the line 2—2 of Fig. 1, with certain gear-wheels, crank-shaft, and other parts omitted.

Like characters of reference designate like parts in all the figures.

The lawn mower shown in this instance includes the two side-plates 5 which are connected together into a rigid main frame by a cross-rod 6; the supporting ground wheels 7 being pivoted to the centers of the side-plates as shown.

Each side plate 5 has an integral rearwardly-extending arm 8, and between the rear ends of these two arms a ground roller 9 is journaled.

The shaft 10 has its ends journaled in the lower rear portions of the side-plates 5, and by the use of gear and ratchet mechanism well known in lawn mowers the ground wheels 7 revolve said shaft.

A push-bar 11 is provided, and the forked arms 12 of this push-bar are pivoted to the side-plates 5 as at 13, the swinging movement of the push-bar and its arms being properly limited by pins 14 which are set in said side-plates.

The parts thus described are well known in lawn mowers, as are also certain grass-cutting blades which are commonly carried by the shaft 10 but not shown in this instance.

The grass-cutting blades referred to are usually the first parts of the machine to become useless from wear, injury, and want of alinement, leaving the other parts of the machine practically as good as new.

In carrying out the objects stated, the inventor provides improved means whereby a sickle-bar 15 may be attached to the main frame of the machine and whereby a reciprocating sickle 16 in said sickle-bar may be driven.

There is provided a triangular cast-metal frame 17 which in this instance is placed in a vertical plane in close proximity to the inner surface of the right-hand side plate 5.

The upper corner of this frame 17 is formed into a two-part clamp which rigidly embraces the cross-rod 6 to support said frame, the lower portion 17$^b$ of the clamp being integral with the frame and having the upper part 17$^c$ secured to it by screws 18.

To provide at least two-point bearing contact of the frame 17 with the main frame of the machine, the lower rear corner of said frame 17 is bifurcated, as at 19, and straddles a boss 20 which is integral with the right-hand side-plate 5 and forms the usual bearing for the shaft 10.

This arrangement keeps the frame 17 from revolving around the rod 6 and removably anchors said frame as a rigid part of the main frame of the machine.

The lower front end of the frame 17 terminates in a U-shaped formation 17$^d$, and to this formation the two forks 21$^b$ of a bifurcated sickle-bar-supporting arm 21 are pivoted on a fore-and-aft axis.

A sickle-bar 15 is pivoted to the free end 23 of this arm 21, as at 24, on a fore-and-aft axis, and the extreme outer or left-hand end of the sickle-bar is connected with a lug 25 on the left-hand rearward arm 8 by a rod 26 which has universal-joint connection with said lug and sickle-bar.

It will be seen that in pushing the main frame of the machine forward the sickle-bar 15 is carried forward in the same manner as the corresponding part of a mowing machine.

The sickle-bar 15 is provided at its rear edge with small supporting ground rollers 27 which are pivoted in bearings 28.

The usual sickle 16 is arranged to reciprocate lengthwise of the sickle-bar 15 in the usual way.

To drive this sickle 16, a shaft 30 is journaled in a fore-and-aft direction in bearings 31 and 32 projecting from the frame 17, and the rear end of this shaft is provided with a beveled gear-pinion 33 which is driven by a larger gear-wheel 34 on the shaft 10.

The front end of the shaft 30 is provided with a crank-wheel 35, and motion is imparted from this crank-wheel to the sickle 16 through a connecting-rod 36.

All that is necessary to prolong the life of the common revolving-knife machine is to remove from the shaft 10 all blades or other grass-cutting parts and place on said shaft the gear-wheel 34, the frame 17 and its attached parts thus being put in place.

The following is claimed:—

In combination with the frame of a machine including side-plates connected by a cross-rod, ground wheels pivoted to the side-plates, a shaft journaled through the side-plates and adapted to be driven by the ground wheels, one of the side-plates having a boss forming a bearing for said shaft, a supporting frame embracing the cross-rod and having an extension straddling the boss, a second shaft journaled in the supporting frame and having a gear-pinion, a gear-wheel carried by the first-named shaft and meshing with said gear-pinion, grass-cutting means carried by the supporting frame and adapted to be driven by the second shaft.

Witness my hand this 10 day of April, 1920.

WESLEY H. PHILLIPS.